United States Patent [19]
Rattunde

[11] Patent Number: 4,927,404
[45] Date of Patent: May 22, 1990

[54] LINK CHAIN FOR AN INFINITELY VARIABLE CONE DRIVE DISK TRANSMISSION

[75] Inventor: Manfred Rattunde, Bad Homburg, Fed. Rep. of Germany

[73] Assignee: Reimers Getriebe AG, Zug, Switzerland

[21] Appl. No.: 378,362

[22] Filed: Jul. 11, 1989

[30] Foreign Application Priority Data

Aug. 6, 1988 [DE] Fed. Rep. of Germany ....... 3826809

[51] Int. Cl.$^5$ .............................................. F16G 1/24
[52] U.S. Cl. ..................................... 474/242; 474/245
[58] Field of Search ................ 474/206, 201, 212–217, 474/237, 240, 242, 245

[56] References Cited

U.S. PATENT DOCUMENTS

| | | | |
|---|---|---|---|
| 4,547,182 | 10/1985 | Rattunde | 474/214 |
| 4,618,338 | 10/1986 | Rattunde et al. | 474/242 X |
| 4,631,042 | 12/1986 | Rattunde | 474/242 X |
| 4,710,154 | 12/1987 | Rattunde | 474/242 |

FOREIGN PATENT DOCUMENTS

| | | |
|---|---|---|
| 1065685 | 9/1959 | Fed. Rep. of Germany . |
| 2848167 | 2/1980 | Fed. Rep. of Germany . |
| 3027834 | 2/1982 | Fed. Rep. of Germany . |
| 3129631 | 2/1983 | Fed. Rep. of Germany . |
| 3324318 | 1/1985 | Fed. Rep. of Germany . |

Primary Examiner—Thuy M. Bui
Attorney, Agent, or Firm—Frishauf, Holtz, Goodman & Woodward

[57] ABSTRACT

The link chain has links which are coupled together by connecting joint elements (2, 3), formed with end surfaces which transfer frictional forces between a cone disk and the chain. A plurality of links are coupled to these connecting joint elements which form an essentially uniform overall cross section, transferring force between the connecting joint elements and the links. In order to provide for uniform force transfer, some of the links (4, 5, 6, 6', 8, 9, 10) are strengthened with respect to others or "normal", usually interiorly located links (1, 8). The strengthening can be obtained by using higher strength material, making the links thicker or doubling link elements to form a double-thickness link.

16 Claims, 4 Drawing Sheets

LINK CHAIN FOR AN INFINITELY VARIABLE CONE DRIVE DISK TRANSMISSION

Reference to related patents, assigned to the assignee of the present application, the disclosures of which are hereby incorporated by reference:

| |
|---|
| 4,547,182, Rattunde |
| 4,618,338, Rattunde et al |
| 4,631,042, Rattunde |

Reference to related patent disclosures:

| | | |
|---|---|---|
| German Patent | 1 065 685, | Besel |
| | 28 48 167 | |
| | 31 29 631 | |
| | 30 27 834 | |

The present invention relates to a link chain for an infinitely variable transmission, and more particularly to such a link chain having link elements and connecting joint elements passing through apertures in plate-like links, in which the connecting joint elements are adapted to be engaged by facing surfaces of disks, at least one of which is a cone disk.

BACKGROUND.

Cone disk, infinitely variable transmissions frequently use link chains to connect spaced cone disks, in which the end faces of connecting joint elements engage between the drive disks, at least one of which is conical, for transfer of force by frictional engagement of the connecting elements with the links of the link chain. Many such types of link chains are known and have been described in the technical and the patent literature; reference is made, for example, to the following patents:

| |
|---|
| U.S. Pat. No. 4,547,182, Rattunde |
| U.S. Pat. No. 4,618,338, Rattunde et al |
| U.S. Pat. No. 4,631,042, Rattunde. |

The structural arrangement of the link chain in infinitely variable transmissions (IVTs) is particularly important and two types of link chains can be distinguished. One is the three-link or triple-link chain arrangement and the other the dual-link or symmetrical-link chain arrangement. Reference is made, in this connection, to the above referred-to U.S. Pat. No. 4,631,042. In that patent, FIGS. 2 and 3 illustrate, respectively triple and dual or symmetrical-type chains and explain the differences in structural arrangements. A brief explanation of the differences in position and arrangement of the links will be given below in the detailed description of the present application.

The force transmission capability as well as the loading capability of the link chains can always be improved; various proposals to improve the strength and operating efficiency of the link chain have been proposed and specific reference to one such improvement is made to patent: U.S. Pat. No. 4,547,182. This patent describes a specific arrangement of the links in a triple-link chain.

THE INVENTION.

It is an object to further improve link chains for use in IVTs, and especially to improve the load carrying capability and energy transmission capability thereof, in a simple way which does not cause substantial costs and which permits ready assembly, including automated assembly. It is an object to so improve this chain that the strength only of individual links has to be considered. Accordingly, either the overall link material to be used should be reduced or, with a given quantity of material for the links, the transmission capability of the chain should be increased, so that the existing link material can be used to best advantage.

Briefly, the links are arranged in groups; since not all the links of all the groups are uniformly or uniformly stressed, in operation of the chain, links in those groups which are understressed or underloaded with respect to other groups are strengthened. This strengthening can be effected by either increasing the thickness of the links, doubling-up of the links, thereby in effect increasing their thickness, or using links of material which is stronger than other links.

If the link chain arrangement is of the triple-divided or three-link system type, the links are located longitudinally staggered along the length of the chain in groups and so positioned that a theoretical line connecting the centers of gravity of laterally adjacent links extends at an inclination with respect to the longitudinal direction of the chain. Those groups of the links which have an overall cross section lower than that group of the links which has the highest cross section include special links which are structurally stronger than the remaining links; typically, the structurally stronger links are positioned at the outer sides of the chain, the links inwardly of the outer sides all being identical and, also, identical to the links of the group which has the highest cross section. The inwardly positioned links of all the groups can then be identical. In chains which are symmetrical with respect to a center line, that is, have two groups, the groups are placed to form, alternately with respect to a direction transverse of the chain, respectively wider groups and narrower groups. The outermost links of the wider groups are located outside, with respect to the center line of the chain, of the outermost links of the narrower groups. At least one of the inner links, and preferably the center link of the wider groups, and the outermost links of the narrower groups, are made to be structurally stronger than the remaining links of the respective groups.

The present invention is based on the discovery that, surprisingly, in spite of symmetrical construction and arrangement of the chain as a whole, selected links are loaded differently from others. Consequently, some links are overdimensioned and others underdimensioned with respect to the actual loading or, if properly dimensioned for actual loading, those links which are not entirely loaded are excessively dimensioned, resulting in an excessively heavy chain, requiring excessive and unnecessary quantities of material.

The discovery and realization of this uneven loading of the respective links then permits construction of chains, in accordance with the invention, regardless of the type of chain used, triple division or dual division, in which all the links are loaded to their design level. This permits, either, weakening the normal, typically central links, while retaining the overall strength and force and energy transmission capability of the chain or, alternately, to increase the transmission capability of the chain by leaving the normal or standard links and merely reinforcing or strengthening those links which are especially stressed, by increasing their thickness, doubling up, or using higher strength material.

Overall, thus, a chain in accordance with the present invention can be made more cheaply given a predetermined load carrying capability, without, however, essentially increasing the manufacturing costs, or the size of the chain.

In accordance with a feature of the invention, the extra-strength or reinforced links can be made of a material stronger than the others. This does not in any way change the arrangement of the links, nor the overall size of the chain. It is only necessary to characterize certain links, made of a different material. In an automated production, automatically assembling the links on a chain, no specific problems arise in feeding specially characterized links into predetermined positions.

In accordance with another feature of the invention, the extra-strength links are thicker than the others. Again, the load-carrying capability of the overall chain can be influenced without any problems. The extra-thickness links will have exactly the same shape as the other, or "normal" links. In an automatic assembly or production system, such extra-thickness links can be introduced easily into the production sequence.

In accordance with another feature of the invention, the links which are to be reinforced are double; in other words, for production and automated assembly, links at predetermined positions are doubled. In an automated assembly, it is only necessary to suitably modify a control program, for example a numerical control, to instruct the assembly machine to place two standard links next to each other at predetermined positions.

DETAILED DESCRIPTION.

Basically, the links of FIGS. 1—4 are similar, and utilize a three-repeating or triple repetitive link system. The chain of FIG. 5 has a two or dual-repeat system arrangement.

The chains of FIGS. 1—4, constructed in a diagonal three-link system are also shown and described in detail in patent: U.S. Pat. No. 4,547,182, to which reference may be made.

Figure 1:
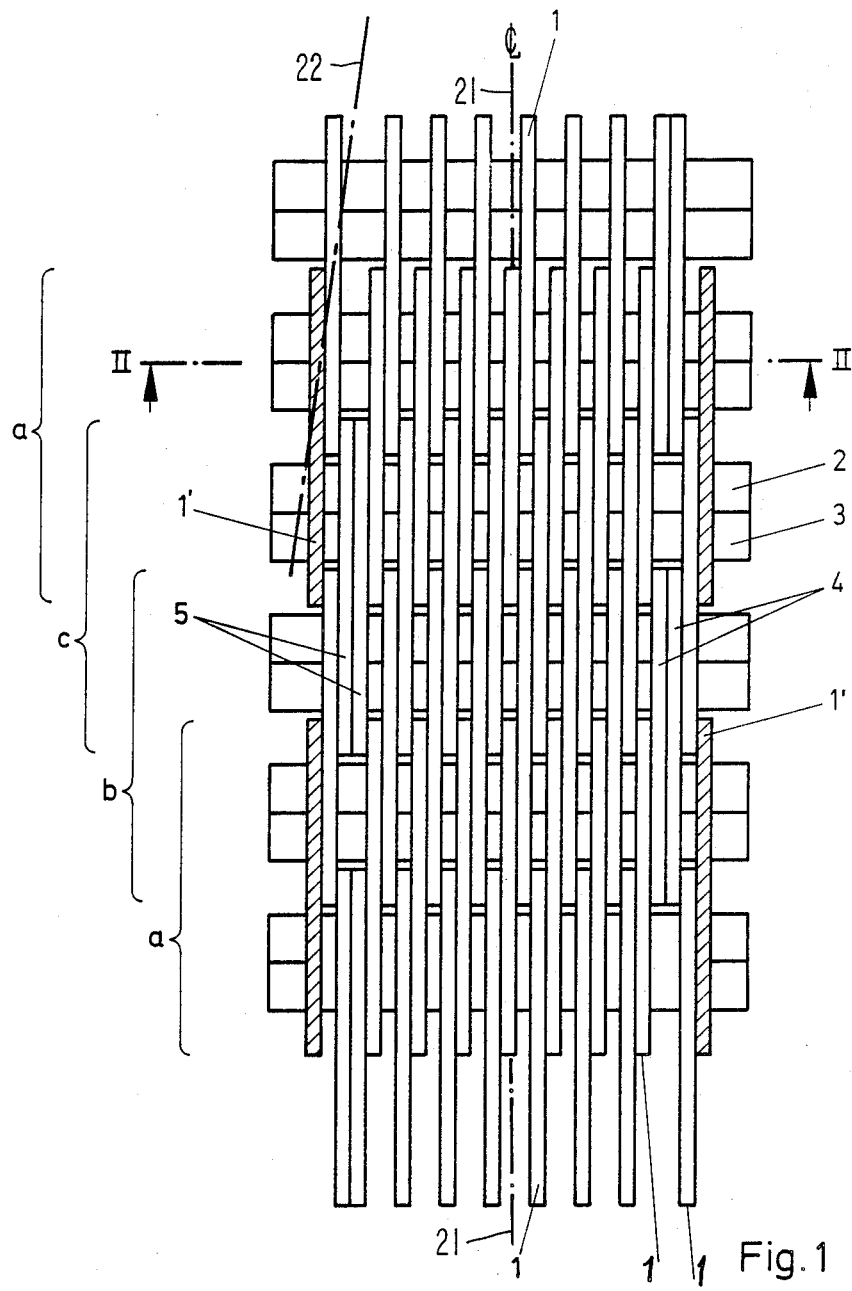
FIG. 1 is a partial view of a link chain for an IVT, stretched out, using a triple-link arrangement, and taken along the section line I—I of FIG. 2.
Figure 2:
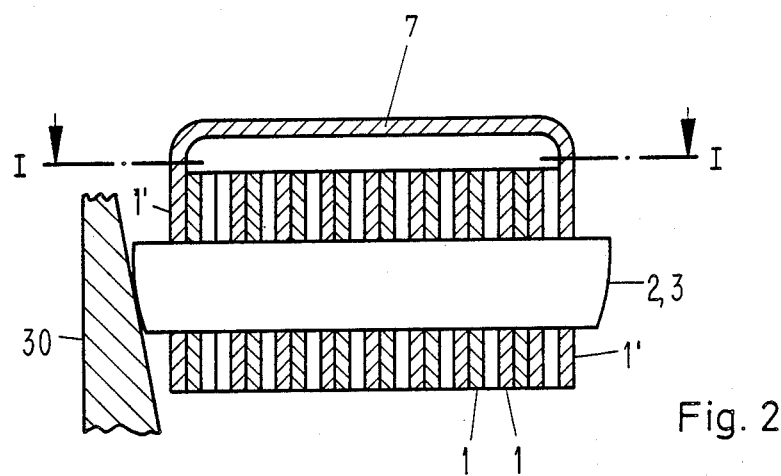
FIG. 2 is a cross section along line II—II of FIG. 1.
Figure 4:
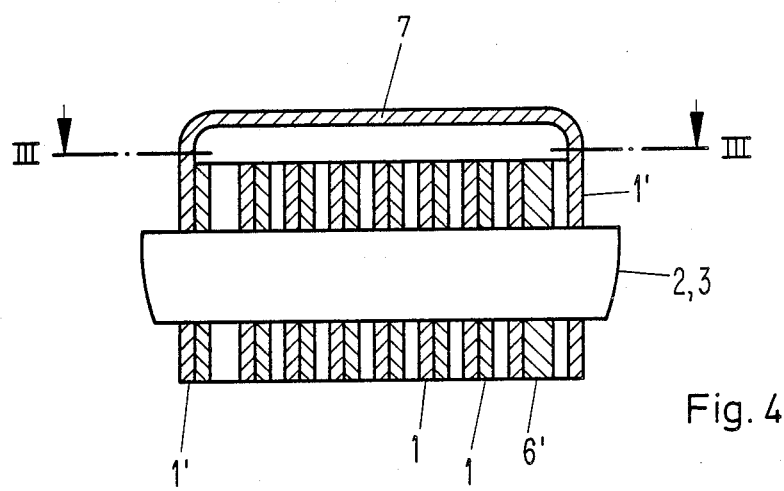
FIG. 4 is a cross section of the chain of FIG. 3, along line IV—IV of FIG. 3.
Figure 3:
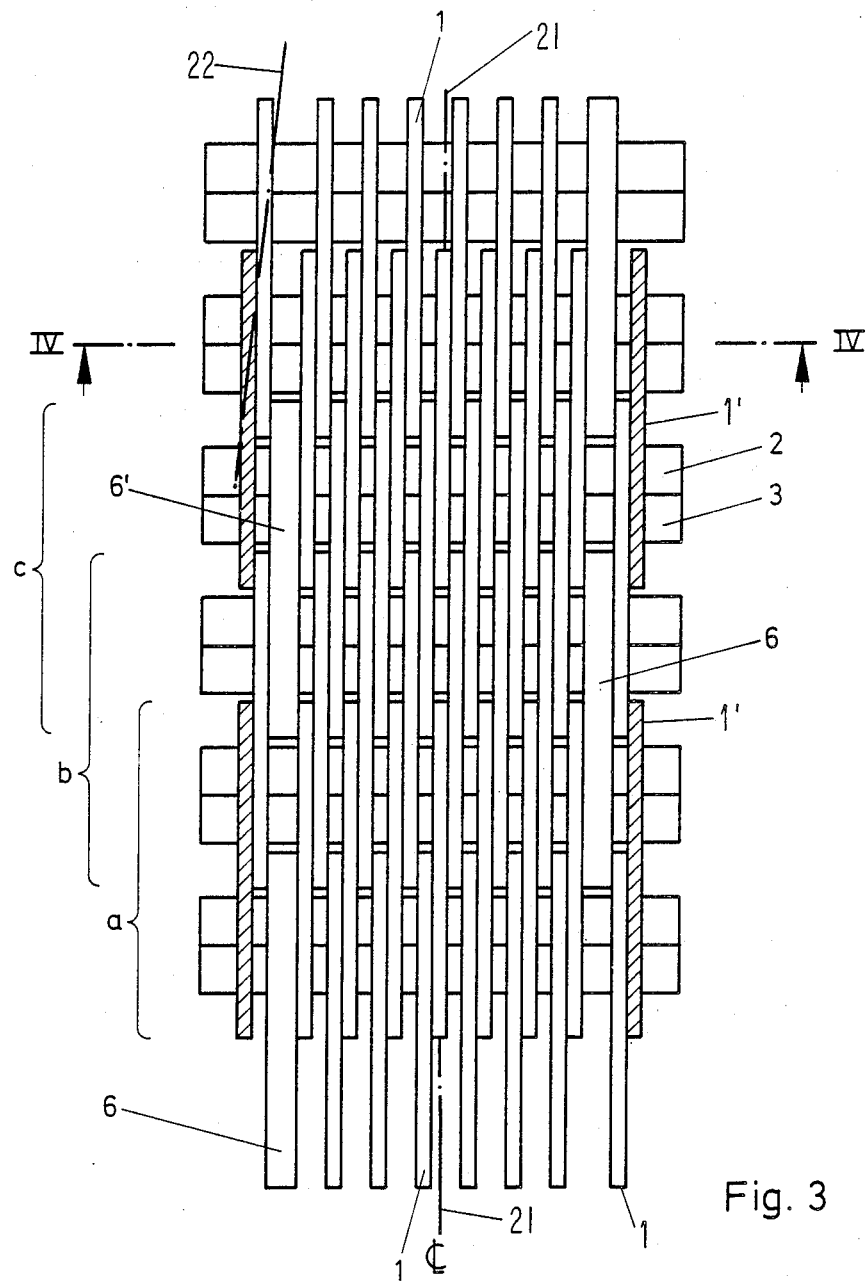
FIG. 3 is a top view of a chain similar to FIG. 1, and illustrating a modification, taken along line III—III in FIG. 4.

Basically, the chain of FIGS. 1—4 is constructed by sequential regularly recurring chain link groups, illustrated in FIGS. 1 and 3 with the group identification a, b and c.

The chain has identical links 1 which are pivotably connected by rocking joint connecting elements 2, 3, forming connecting links. The connecting joint elements, when assembled to drive disks, frictionally engage drive disks at their end faces. One such drive disk, in form of a cone disk, is shown in FIG. 2 in fragmentary form at 30. A mirror-identical disk can be placed at the right side of the chain of FIG. 2; since the system of introducing drive force to the link chain as such is known, only one such drive disk is shown, and then only schematically. The outermost links of the widest link group are shown at 1', and include a cross element 7 in order to hold the links together and in position on the connecting joint elements 2, 3. The cross element 7 may be in form of a bail, a cross strap or the like, and the links 1', 1' together with the cross element 7, can form a unitary element, as well known, extending transversely to the links or, in other words, to the running direction of the chain.

The respective links of group a, taken together, have the largest cross section and the links of group a extend over the greatest width of the chain, with respect to a central axis 21 of the chain. The links of the group b as well as the links of the group c, overall, are narrower than the links of the group a. With respect to the longitudinal axis 21, the center of the links of group b are shifted towards the left, and the center of the links of group c is shifted towards the right.

As can be seen from FIG. 1, and in accordance with the present invention, some of the links of the groups b and c are doubled. This is shown in FIG. 1 with respect to links 4 and 5, where the overall arrangement of the links, with respect to the longitudinal axis 21 of the chain, has the smaller width. The longitudinal axis of the chain is defined by the center between the outermost links 1' of the group a.

In accordance with a feature of the invention, rather than doubling the respective links as shown at 4 and 5 in FIG. 1, double-width unitary links are used. Thus, in the groups b and c, links 6 and 6' (FIG. 3) are made of material which is thicker than the material of the remaining or "normal" links 1 of the respective groups. In accordance with a feature of the invention, intermediate links may also be thickened, in which the increase in material width of the respective links, starting from the center line 21 of the chain, smoothly increases. Such changes in thickness, either by increasing the outermost links 6, 6' only, or increasing some other links as well, can be used, as desired, and in accordance with design requirements and transmission requirements of the respective chain. In the simplest manner, the construction of FIG. 1 is suitable in which the increased strength of the respective links is obtained by doubling the link elements; alternatively, the construction of FIG. 3 can be used, in which the increased strength of the outermost links is obtained by increasing only the thickness of those links.

Figure 5:
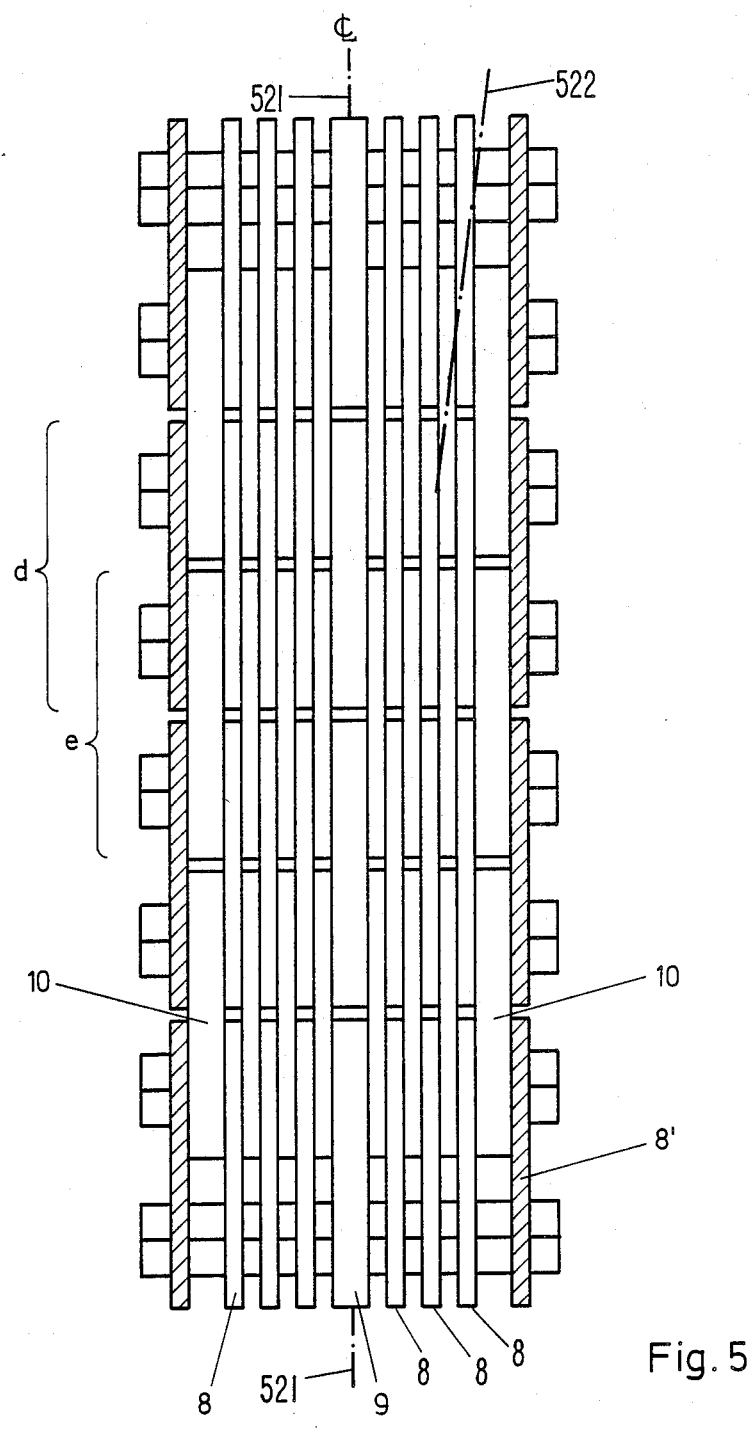
FIG. 5 is a top view of a dual-link chain illustrated similar to the illustrations of FIGS. 1 and 3.

FIG. 5 illustrates a chain which is strictly symmetrical with respect to a center line 521, and in which two link groups d and e are used, alternately located along the length of the chain. This is also referred to as the dual-link system chain, in which alternately placed link elements of groups d and e are located, thereby constructing a chain which is strictly symmetrical with respect to the center line 521. Again, the links of group d have a wider transverse extent on the chain than the links of group e, which have a narrower link group dimension, in both cases taken transversely across the running direction of the chain. Thus, also, the overall material thickness of the respective link groups will differ.

In accordance with the invention as illustrated in the chain of FIG. 5, "normal" links 8 are used for the chain except that the group d has a central link 9 which is heavier or thicker than the other, or "normal" links. The link group e has two thickened outer links 10 and otherwise "normal" links 8. The outermost links 8' of group d are again formed in C shape, similar to the links 1' (FIGS. 2, 4) to include a transversely extending bail or strap 7 (not shown) in order to hold the assembly together.

The chain, whether of dual or triple-repeat construction, permits increasing the energy transfer capability without increasing the size thereof; or, for a given energy transfer capability, to reduce the size, weight and/or material requirements. A chain of a given size, thus, can transfer more energy if the respective links 4, 5 (FIGS. 1, 3) and 9, 110 (FIG. 5) are increased in thickness, doubled, or made of stronger material which can be more highly stressed; conversely, a chain with a given energy transfer capability can be reduced in size or made with a lesser quantity of material, and thus being lighter.

The arrangement is compatible with automatic assembly. It is only necessary to suitably program-control an assembly machine to introduce the respective thicker links 6 (FIG. 3) or 9, 10 (FIG. 5), respectively; or, in the simplest manner, to double-up links 4, 5 (FIG. 1) by assembling two "normal" links at a given position. Of course, doubling-up or assembling two "normal" links 8 in the positions of links 9, 10 (FIG. 5) is equally possible, and this solution, although not shown specifically in the drawing, can, obviously, also be used.

Rather than using thicker links 6 (FIG. 3) or 9, 10 (FIG. 5) or, in the arrangement of FIG. 1, doubling-up links, it is equally possible to use links which have the same dimension as the links 1, 8, respectively, but are made of higher strength material which can be more heavily stressed.

Various changes and modifications may be made within the scope of the inventive concept.

To illustrate the staggered arrangements, FIGS. 1, 3 and 5 show connecting lines 22, 522, respectively, between adjacent links which extend at a slant with respect to a center line 21, 521, respectively of the chain.

I claim:

1. Link chain for an infinitely variable cone drive disk transmission having
    a plurality of plate-like links, formed with openings therein;
    connecting joint elements (2, 3) fitted into said openings,
    said connecting joint elements, in operation of the chain and upon placement between the drive disks (30), transferring by frictional force torque between the drive disks and the link chain by engagement of the end surfaces of the connecting joint elements with the faces of the drive disks,
    wherein the links are located next to each other such that the overall cross section of the links transferring said forces and engaged by the connecting joint elements is essentially constant;
    the links are located longitudinally staggered along the length of the chain in groups (a,b,c;d,e) and so positioned that a theoretical line (22, 522) connecting the centers of gravity of laterally adjacent links extends at an inclination with respect to the longitudinal direction of the chain; and
    wherein those groups (b,c;e) of the groups of the links(a,b,c;d,e) which have an overall cross section smaller than that group (a;d)of the links which have the largest cross section includes links (4, 5, 6, 6',10) positioned at outer sides of the chain which are structurally stronger than the links (1, 8) positioned inwardly of the outer links.

2. The link chain of claim 1, wherein three longitudinally staggered groups of links (a, b, c) are provided.

3. The link chain of claim 1, wherein the inwardly positioned links (1) of all the groups are identical.

4. The link chain of claim 1, wherein the links (4, 5, 6, 6', 10) which are structurally stronger are made of a higher strength material than the inwardly positioned links.

5. The link chain of claim 4, wherein said links of stronger material are dimensionally identical to the inwardly positioned links.

6. The link chain of claim 1, wherein said structurally stronger links (6, 6', 10) are thicker than said inwardly positioned links (1).

7. The link chain of claim 6, wherein said thicker links have the same plan shape as said inwardly positioned links.

8. The link chain of claim 1, wherein said structurally stronger links (4, 5; 10) comprise a plurality of adjacently located essentially identical link elements which, in turn, are essentially identical to said inwardly positioned links.

9. Link chain for an infinitely variable cone drive disk transmission having
    a plurality of plate-like links, formed with openings therein;
    connecting joint elements (2, 3) fitted into said openings,
    said connecting joint elements, in operation of the chain and upon placement between the drive disks (30), transferring by frictional force torque between the drive disks and the link chain by engagement of the end surfaces of the connecting joint elements with the faces of the drive disks,
    wherein the links are located next to each other such that the overall cross section of the links transferring said forces and engaged by the connecting joint elements is essentially constant;
    the links are located longitudinally staggered along the length of the chain in grounds (d, e), said groups being located in the chain symmetrically with respect to a longitudinal center line (521) of the chain and positioned to form, alternately with respect to a direction transverse of the chain, respectively wider groups (d) and narrower groups (e),
    the outermost links (8,) of the wider groups (d) being located outside, with respect to said center line (521), of the outermost links of the narrower groups (e); and
    wherein at least one of the inner links (9) of the wider groups (d) and the outermost links of the narrower groups (e) are structurally stronger than the remaining links of the respective groups.

10. The link chain of claim 9, wherein all said remaining links of all said groups are identical.

11. The link chain of claim 9, wherein said at least one inner link (9) of the wider group (d) is positioned at said longitudinal center line (521) and comprises a single structurally stronger link.

12. The link chain of claim 9, wherein the links which are structurally stronger (9, 10) are made of a higher strength material than the inwardly positioned links.

13. The link chain of claim 12, wherein said links of stronger material are dimensionally identical to the inwardly positioned links.

14. The link chain of claim 9, wherein said structurally stronger links (6, 6', 10) are thicker than said inwardly positioned links (1).

15. The link chain of claim 14, wherein said thicker links have the same plan shape as said inwardly positioned links.

16. The link chain of claim 9, wherein said structurally stronger links (4,5;10) comprises a plurality of adjacently located essentially identical link elements which, in turn, are essentially identical to said inwardly positioned links.

* * * * *